(No Model.)

R. S. MUNGER.
SAW SHARPENING TOOL.

No. 265,854. Patented Oct. 10, 1882.

WITNESSES:
Fred. G. Dieterich
A. G. Syne

INVENTOR:
Robt. S. Munger
BY
ATTORNEYS.

(No Model.) 2 Sheets—Sheet 2.

R. S. MUNGER.
SAW SHARPENING TOOL.

No. 265,854. Patented Oct. 10, 1882.

WITNESSES:
Fred. G. Dieterich
A. G. Syne

INVENTOR:
Robt. S. Munger
BY
ATTORNEYS.

UNITED STATES PATENT OFFICE.

ROBERT S. MUNGER, OF MEXIA, TEXAS.

SAW-SHARPENING TOOL.

SPECIFICATION forming part of Letters Patent No. 265,854, dated October 10, 1882.

Application filed March 3, 1882. (No model.)

*To all whom it may concern:*

Be it known that I, ROBERT S. MUNGER, of Mexia, in the county of Limestone and State of Texas, have invented a new and useful Improvement in Sharpening-Tools for Cotton-Gin and other Saws, of which the following is a full, clear, and exact description, reference being had to the annexed drawings, forming part of this specification.

My invention consists of a rotary tool having an annular rim or a curved rim, made either concentric or helical, and with one or both filing-surfaces of the rim inclined inward from heel to edge toward the axis of the tool, whereby the rim is adapted to give to the face or face and throat of a saw-tooth a smooth convex surface to prevent it from cutting or napping the lint.

In the drawings, Figure 1 is a side elevation of a saw-sharpening machine, showing the manner of applying my improved sharpening-tool to use. Fig. 2 is a plan of a helical or self-feeding tool detached from the mandrel. Fig. 3 is a side elevation of a concentric tool, partly in section, showing reversible cutting-edges. Fig. 4 is a similar view, showing the inner cutting-surface made straight instead of inwardly inclined; and Figs. 5, 6, 7, 8 are sectional views, showing different modes of attaching the tool to a mandrel.

Heretofore a rotary tool for sharpening cotton-gin saws has been constructed with a flaring or bowl-shaped file, with a view to sharpening the teeth with rapidity and regularity; but with the flaring or bowl shape nothing but a sharp edge can be given to the throat and no practical convexity to the face.

To prevent the teeth of cotton-gin saws from cutting or napping the lint, it is essential that the face and throat of the tooth shall be smooth and convex, so as to present no angular or sharp edges to the fiber. I therefore construct the file with its rim or cutting-edge inwardly inclined, so that when rotated in contact with the throat and face of the tooth it will give them a convex form. The file is cut on the outer surface as well as the inner surface, so as to reduce the back of the tooth at the same time the face is reduced.

The manner of applying the tool to use is shown in Fig. 1, in which A is the mandrel, supported in a suitable frame, and B is the tool, secured to one end of the mandrel. When the helical or self-feeding form shown in Fig. 2 is used the saw will be fed by the file, which will pass from one tooth to another at each revolution of the file. When the concentric form is used additional means will be supplied for feeding the saw to the tool.

Figure 1:
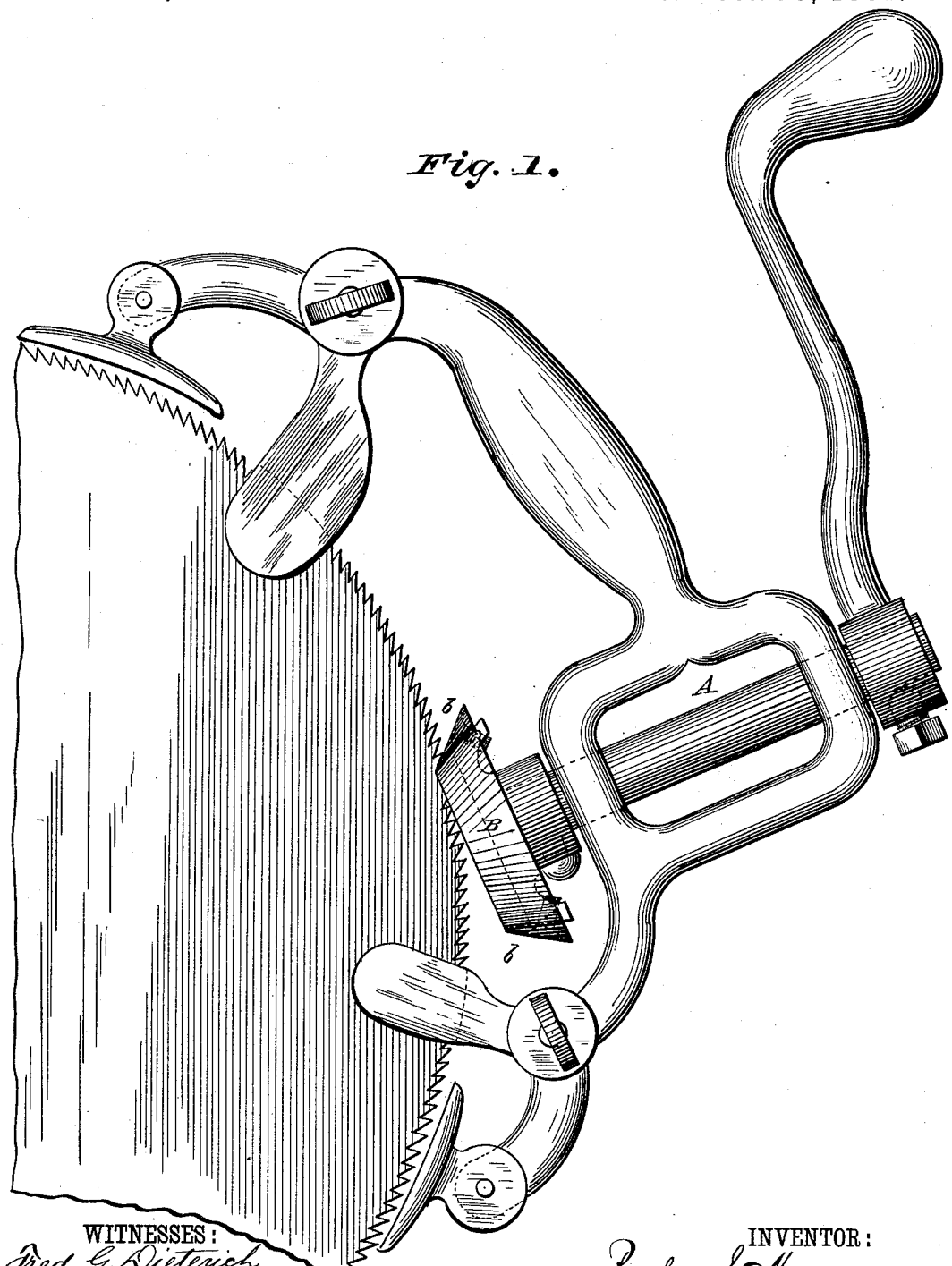
Figure 2:
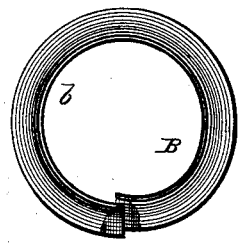
Figure 3:
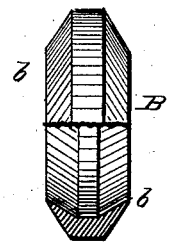
Fig. 3 shows the file with the rim bodily inclined inward toward the axis of the tool.
Figure 4:
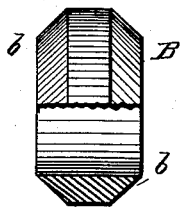
Fig. 4 shows the inner side of the rim made straight or parallel with the axis, and the outer surface beveled or inclined inward. This form is best adapted for using emery or other grinding material to form the filing-surface.
Figure 5:
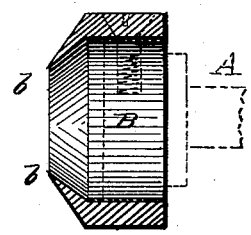
Figure 6:
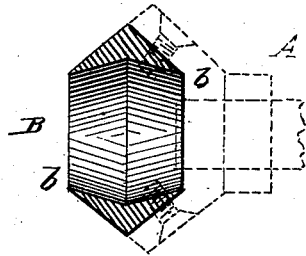
Figure 7:
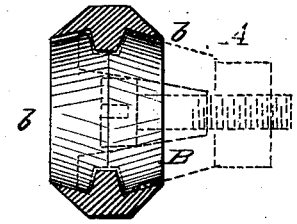
Figure 8:
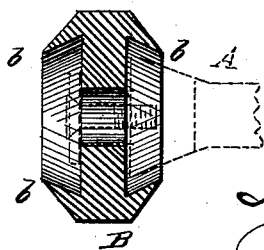

In the helical or self-feeding tool I design to use either a straight inside surface, with the outside surface inclined inward, or with both surfaces inwardly inclined, as shown in Figs. 2 and 3, respectively. If desired, the inner surface of the helical file, whether straight or beveled, may be file-cut before the metal is bent to form the tool, since the operation can be easily performed at such stage.

In Figs. 5, 6, 7, and 8 the body of the tool is slightly modified to show various modes of attaching it to a mandrel. I do not, however, claim in this application any special means of attaching the tool to a mandrel, but limit my claims to the tool.

Having thus described my invention, what I claim, and desire to secure by Letters Patent, is—

1. A rotary saw-sharpening tool having a curved edge-shaped rim provided with filing-surfaces on the edge and each side thereof, one or both of which sides are inclined inwardly from heel to edge toward the axis of the tool, substantially as and for the purpose described.

2. A rotary self-feeding saw-sharpening tool having an edge-shaped rim of helical form provided with a file cut on the edge and sides thereof, one or both of which sides are inwardly inclined from heel to edge toward the axis of the tool, substantially as and for the purpose described.

ROBERT S. MUNGER.

Witnesses:
C. H. MUNGER,
BERNT JOHNSON.